H. W. Prouty,

Jaw Trap,

Nº 82,246. Patented Sep. 15, 1868.

Witnesses.
Wm Davis
W. H. Dennis

Inventor.
Henry W. Prouty
By his Atty. J. Dennis Jr.

United States Patent Office.

HENRY W. PROUTY, OF BOSTON, MASSACHUSETTS, ASSIGNOR TO HIMSELF AND HOWARD TILDEN, OF SAME PLACE.

*Letters Patent No. 82,246, dated September 15, 1868.*

IMPROVED ANIMAL-TRAP.

*The Schedule referred to in these Letters Patent and making part of the same.*

TO ALL WHOM IT MAY CONCERN:

Be it known that I, HENRY W. PROUTY, of Boston, Suffolk county, State of Massachusetts, have invented an Improved Animal-Trap; and I do hereby declare the following description and accompanying drawings are sufficient to enable any person skilled in the art or science to which it most nearly appertains to make and use my said invention or improvements without further invention or experiment.

The nature of my invention and improvements consists in providing two arms, pivoted on the two sides of a rectangular block or frame, having spears projecting across the end of the block, and nearly meeting in front of a hole or opening in said end, within which the bait is to be placed. The arms aforesaid are drawn together by a spiral or other spring attached to them at points somewhat in front of their pivots, and the trap is set by opening out the front ends of the arms until the rear ends reach a bent-lever catch, pivoted near its angle, and having an arm extending upward, so as to be met by a bait-rod extending through the block from the bait or bait-cup in the front hole before mentioned.

To describe my invention more fully, I refer to the accompanying drawings, forming part of this specification, of which—

Figure 1:
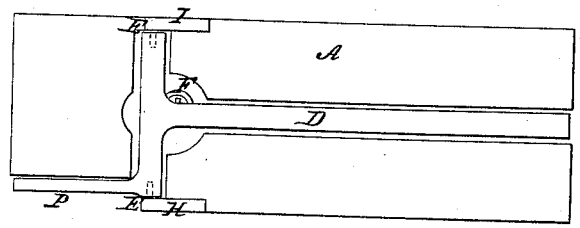

Figure 1 is a side elevation of a trap with my improvements.

Figure 2:
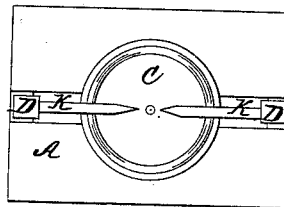

Figure 2, an end view.

Figure 3:
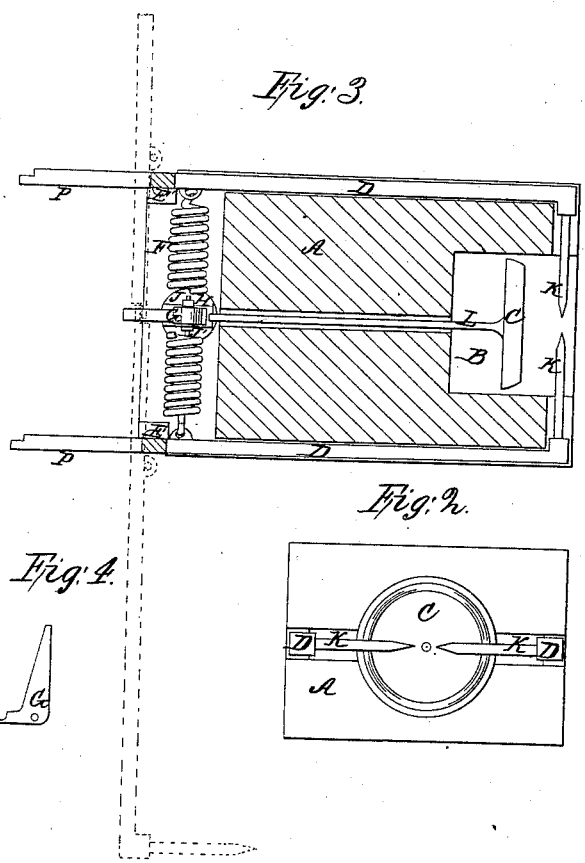

Figure 3, a section at the red line z z on fig. 1; and

Figure 4:

Figure 4 a side view of the bent-lever catch.

On all the figures, the same letters mark the same parts.

A is the block or frame, to which the other parts of the trap are attached; B, the bait-hole, containing the bait-cup, C, which has a rim inclining to the centre, making the opening smaller than the bottom, to secure the bait. This I remove from the opening or hole in the block or frame to arrange the bait, and also when blood or other stain is to be washed from the block or frame.

The T-shaped arms, D D, are pivoted at E and E' by pins projecting from the plates H and I, as shown in dotted lines in fig. 1, said plates extending across the block, and screwed fast to it. These arms occupy grooves in the sides of the block, and are connected by the spring F, the middle part of which is broken out in the drawing, to show more clearly the position of the bent-lever catch G, which is pivoted upon the plate H at J and J'. The arms D D have also the spears K K, projecting horizontally and at right angles to the arms, so as nearly to meet in front of the bait-hole B.

From the lower extremity of the rear part of the arms D D, the arms P P extend back to the rear end of the block, which is cut away beneath to allow these arms to swing under it, and, in setting the trap, the front ends of the front arms D D are swung out to the position shown in red in fig. 3, and until the ends of the rear arms reach the bent catch G, so as to be held by it.

A bait-rod, L, extends through the block, from the bait or bait-cup C to the upper extremity of the catch G, and, when an animal attacks the bait with jaws or paw, so as to push the rod L, it comes in contact with the catch G, and releases the arms, and the front arms being drawn forcibly forward by the spring F, the spears K K pierce the animal in the region of the eye, and its life is extinguished.

I claim the arrangement of the arms D D, spears K K, bait-rod L, and bait-cup C, in combination with the spring F and catch G, the whole being constructed and arranged upon a block or frame, substantially as described and for the purpose set forth.

HENRY W. PROUTY.

Witnesses:
HOWARD TILDEN,
GEO. T. REED.